United States Patent Office 3,793,296
Patented Feb. 19, 1974

3,793,296
HETEROCYCLIZED POLYMER
William J. I. Bracke, 120 Ransbeekstraat,
Brussels, Belgium
No Drawing. Continuation-in-part of abandoned application Ser. No. 61,826, Aug. 6, 1970. This application July 17, 1972, Ser. No. 272,457
Int. Cl. C08f 9/00
U.S. Cl. 260—94.1         14 Claims

ABSTRACT OF THE DISCLOSURE

A new polymer composition prepared by the reaction of a polybutadiynylene with hydroxylamine, said polymer having the formula

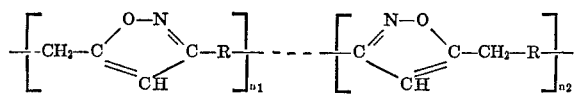

wherein R is a divalent radical which is either an alicyclic, aliphatic, alicyclic-aliphatic radical or a heterocyclic or carbocyclic aryl radical or a substituted such radical and wherein $n_1$ is 0 or an integer and $n_2$ is 0 or an integer but with the total of $n_1$ and $n_2$ being no less than 5.

---

The present invention is a continuation-in-part of my copending application, Ser. No. 61,826, filed Aug. 6, 1970, now abandoned, and relates to new heat-resistant polymers. More particularly, the present invention relates to new heat-resistant heterocyclized polybutadiynylenes having a high mechanical strength and to a process for the production of such heterocyclized polybutadiynylenes.

Much effort has been devoted to the development of high-temperature, heat-resistant polymers. Several products have been developed which display considerably improved properties with respect to heat resistance and stability. However, most of these are not satisfactory for practical use, the main obstacles being either their poor processability or their brittleness or the difficulties encountered to obtain the polymer in form sufficiently pure to have practical use. Also, there still remains room for much improvement in the heat resistance and stability properties of polymers.

It is an object of the present invention to provide new and improved heat-resistant polymers. Another object of the present invention is to provide new polymers highly resistant to heat for long periods of time, and which have a high mechanical strength and are easily worked. Still another object of the present invention is to provide new heterocyclized polybutadiynylene polymers of high heat resistance and stability. Another object of the present invention is to provide a process for producing a new and improved heat-resistant, heterocyclized polybutadiynylene polymer by which such polymers are obtained with substantially quantitative yields and are easily separated from the reaction mixture. Additional objects will become apparent from the following description of the invention herein disclosed.

SUMMARY OF THE INVENTION

The above objects, and others which will appear hereinafter, are realized with the new polymers of the present invention which have the general formula

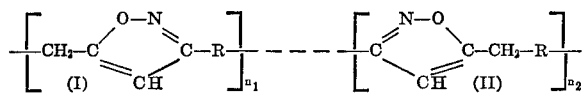

wherein R is a divalent radical which is either an alicyclic, aliphatic, alicyclic-aliphatic hydrocarbon radical or a heterocyclic or carbocyclic aryl radical or a substituted such radical and wherein $n_1$ is 0 or an integer and $n_2$ is 0 or an integer but with the total of $n_1$ and $n_2$ being no no less than 5. In these polymers the repeating units of a particular polymer may correspond to Formula I or to Formula II or repeating units of both Formula I and II may be present in the polymer. The particularly preferred polymer compositions of the present invention are those in which R of Formulas I and II above is a phenylene radical. In these polymers the methylene radical and the isoxazole radical may be linked with the phenylene radical in either the meta- or para-position. The polymer may have all of such linkages in one or the other of these positions or it may contain both types of linkages therein.

In accordance with the present invention, these new polymers are prepared by reacting hydroxylamine with a polymeric diacetylene having the general formula:

(III)         

wherein R is a divalent radical which is either an alicyclic, aliphatic, aliphatic-alicyclic, or a carbocyclic or heterocyclic aryl radical or a substituted such radical and $n$ is an integer of at least 5.

In either Formula I, II, or III, the substituted R radicals may have alkyl, naphthyl, or aryl hydrocarbon groups or halogens, amino, nitro, hydroxyl and like groups as substituents. The R radical when carbocyclic may also be naphthylene. Preferably, however, R is a phenylene or naphthylene radical or a substituted such radical. The R group when heterocyclic aryl may be pyridinediylene. The particularly preferred polymeric diacetylene reactants are those of Formula III above wherein R is a phenylene or naphthylene radical with phenylene being the most useful.

The molecular weight of the new polymers containing isoxazole units in each of the repeating units depends on the molecular weight of the starting polymeric diacetylene. However, those most useful have molecular weights of greater than 1,000; and are more often within the range of 1,000 to 50,000.

The reaction temperature for preparing the polymers of the present invention may vary within wide limits ranging from ambient temperatures and below to 250° C. and higher. However, temperatures higher than 50° C. and lower than 175° C. are preferred. Preparation of the preferred polymers of the present invention may be conveniently carried out at about 100° C. When temperatures higher than the boiling point or the reaction mixture are employed, a pressure vessel is used.

The hydroxylamine is added as such or can be generated in situ. If generated in situ, it can be generated from its chlorohydrate by adding strong bases. At least the minimum amount of 1 mole of hydroxylamine or of its chlorohydrate, per mole of diacetylene functions, should be used. In general, however, an excess of hydroxylamine is advisable to assure optimum yield.

For reasons of solubility and according to the molecular weight of the polymeric diacetylene, solvents such as dimethylformamide, dimethylsulfoxide, pyridine, and a-picoline, are advantageously added to the reaction mixture.

The polymer of the present invention, containing isoxazole units in each of its repeating units, is easily separated from the reaction mixture by adding a non-solvent for the polymer such as water. The precipitated polymer is then filtered, washed with methanol and dried, giving a white, fibrous material.

These polymers are soluble in dimethylformamide, dimethylsulfoxide, N-methylpyrrolidone, trifluoroacetic acid, hexamethylphosphoramide (HMPA), sulfolane and similar solvents.

Solutions containing the polymer of the present invention with an inherent viscosity of 0.6 dl./gram (0.5 g. of polymer in 100 ml. of dimethylformamide at 30° C.) can be easily obtained.

From these solutions tough, colorless films with a high tensile strength can be cast. Using conventional techniques (wet spinning) strong fibers can be spun.

The materials are stable at temperatures higher than 300° C.

Example

A 25 ml. reaction flask equipped with a reflux condenser and a magnetic stirrer was charged with 0.5 g. of polydiethynylbenzene; 10 ml. of a-picoline; and 2 g. of hydroxylamine hydrochloride. The polydiethynylbenzene was one prepared by oxidative coupling of diethynylbenzene. This polydiethynylbenzene had an inherent viscosity of 1.33 dl./gram (viscosity of 0.5 g. of polymer in 100 ml. of hexamethylphosphoramide at 140° C.) and contained 10% of p-phenylene units. The reaction mixture was heated up to 100° C. and kept at this temperature during a period of eighteen hours. The polymer containing isoxazole units was isolated by precipitation in water. The precipitate was washed with methanol and dried in vacuo at 80° C. The yield was 95.6%.

Analysis.—For the polyisoxazole formed: Calculated for $C_{10}H_7NO$ (percent): 76.42, 4.40, 8.91, 10.18. Found (percent): 79.24, 4.35, 7.50, 8.76.

On heating at 320° C., no melting or decomposition was apparent.

A solution of 0.5 g. of this polymer in 100 ml. of dimethylformamide at 30° C. had an inherent viscosity of 0.63 dl./gram.

A film obtained by casting this solution and vacuum drying at 150° C. showed a high tensile strength.

The preparation of this polymer, polyisoxazole, its I.R. spectrum, and proof of its structure is further described in detail in a recent publication of the Journal of Polymer Science, Part A-1, vol. 10, pp. 983–992 (1972), the substance thereof being here incorporated by reference.

What is claimed is:

1. A heat resistant polymer composition wherein the polymer has the formula

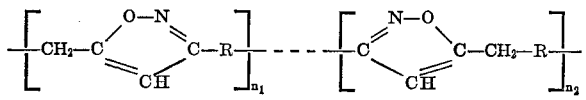

wherein R is a divalent radical selected from the group consisting of alicyclic, aliphatic and alicyclic-aliphatic radicals and heterocyclic and carbocyclic aryl radicals and substituted such radicals and wherein $n_1$ is 0 or an integer and $n_2$ is 0 or an integer with the sum of $n_1$ and $n_2$ being no less than 5.

2. The heat resistant polymer composition of claim 1 where $n_1$ and $n_2$ are integers.

3. The heat resistant polymer composition of claim 1 wherein R is divalent carbocyclic aryl radical.

4. The heat resistant polymer composition of claim 3 wherein said divalent carbocyclic radical is a phenylene radical.

5. The heat resistant polymer composition of claim 3 wherein said divalent carbocyclic radical is a naphthylene radical.

6. The heat resistant polymer composition of claim 1 wherein R is a divalent heterocyclic radical.

7. The heat resistant polymer composition of claim 6 wherein said divalent heterocyclic radical is a pyridinediyl radical.

8. The heat resistant polymer composition of claim 1 wherein R is a substituted divalent radical selected from the group consisting of substituted carbocyclic radicals and substituted heterocyclic radicals.

9. The heat resistant polymer composition of claim 8 wherein the substituents to said substituted divalent radical are selected from the group consisting of alkyl, naphthyl and aryl hydrocarbon radicals and halogen, amino, nitro and hydroxy radicals.

10. The heat resistant polymer composition of claim 4 wherein the repeating units of said polymer are randomly linked through the meta- and para- positions of said phenylene radical.

11. The heat resistant polymer composition of claim 1 having a molecular weight of about 1000.

12. The heat resistant polymer composition of claim 1 having a molecular weight of from 1000 to 50,000.

13. The heat resistant polymer composition of claim 1 having the formula

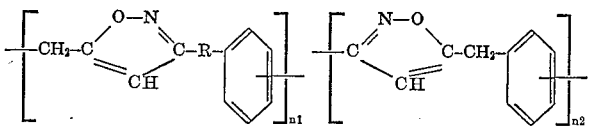

wherein the repeating units of said polymer are randomly ylene radical in either the meta- or para-position and wherein either $n_1$ or $n_2$ may be 0 or an integer but the sum of $n_1$ and $n_2$ is no less than 5.

14. The method of forming a heat resistant polymer composition having the formula

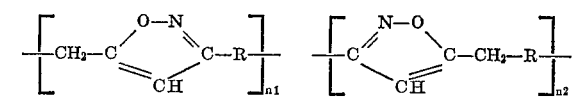

wherein R is a divalent radical selected from the group consisting of alicyclic, aliphatic and alicyclic-aliphatic radicals and heterocyclic and carbocyclic aryl radicals and substituted such radicals and wherein $n_1$ is 0 or an integer and $n_2$ is 0 or an integer with the sum of $n_1$ and $n_2$ being no less than 5, comprising reacting a polybutadiynylene compound having the formula

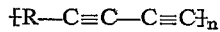

in which R is the divalent radical as identified above with hydroxylamine.

References Cited

UNITED STATES PATENTS

| | | | |
|---|---|---|---|
| 3,213,068 | 10/1965 | Frazza | 260—79.3 |
| 3,309,456 | 1/1967 | Hay | 260—88.2 |
| 3,519,611 | 7/1970 | Hay | 260—94.1 |
| 3,332,916 | 7/1967 | Hay | 260—80 |

JOSEPH L. SCHOFER, Primary Examiner

W. F. HAMROCK, Assistant Examiner

U.S. Cl. X.R.

260—93.5 A